United States Patent [19]

Robertaccio

[11] Patent Number: 5,105,575
[45] Date of Patent: Apr. 21, 1992

[54] FISH HOOK INCUDLING APPURTENANCE FOR RELEASABLE ARTIFICIAL BAIT

[76] Inventor: Frank Robertaccio, 18 Briggs Ct., Queensbury, N.Y. 12804

[21] Appl. No.: 651,513

[22] Filed: Feb. 6, 1991

[51] Int. Cl.⁵ .................................................. A01K 83/06
[52] U.S. Cl. ....................................... 43/44.8; 43/42.37
[58] Field of Search ............... 43/44.8, 43.16, 42.24, 43/42.29, 42.37, 42.38, 42

[56] References Cited

U.S. PATENT DOCUMENTS

| | | | |
|---|---|---|---|
| 77,365 | 4/1868 | Fish | 43/42.16 |
| 1,582,716 | 4/1926 | Wilder | 43/42.37 |
| 2,119,417 | 5/1938 | Brown | 43/42.37 |
| 2,169,929 | 8/1939 | Schumann | 43/42.37 |
| 2,651,133 | 9/1953 | Sharps | 43/42.37 |
| 3,377,734 | 4/1968 | Snow | 43/42.24 |
| 4,149,334 | 4/1979 | Rogers | 43/42.37 X |
| 4,625,451 | 12/1986 | Griffiths | 43/44.8 X |

Primary Examiner—Richard K. Seidel
Assistant Examiner—Patty E. Hong
Attorney, Agent, or Firm—Katherine McGuire

[57] ABSTRACT

A fishing hook having a stem-like appurtenance for releasable attachment of artificial bait provides for an almost limitless selection of various types, shapes and sizes of artificial baits to be chosen by the fisherman. The appurtenance may extend from any position and angle on the hook and various artificial bait securing means are disclosed.

9 Claims, 2 Drawing Sheets

FISH HOOK INCUDLING APPURTENANCE FOR RELEASABLE ARTIFICIAL BAIT

BACKGROUND OF THE INVENTION

This invention relates to fish hooks and artificial baits and, more particularly, to a fish hook including an appurtenance, separate and distinct from the normal hooking portion, onto which a variety of artificial baits, which include novel attachment means, may be releasably and interchangeably mounted as desired to provide for improved orientation and wobble of the fish hook as it is drawn through the water in addition to providing an enticing looking bait for the fish.

Upon a study of the prior art in this field, the present inventor has discovered a wide variety of fish hooks having appurtances intended for a variety of purposes. For example, as seen in U.S. Pat. No. 310,118 which was issued to Bower on Dec. 30, 1884, a rearwardly projecting branch arm extends from an otherwise standard fish hook. As discussed at lines 37-43 of the Bower patent, the arm B is provided to prevent the fish from swallowing the hook as well as to prevent the bait from "slipping up the hook". Attachment of bait to arm B is not suggested and it may also, therefore, be readily apparent that attempted placement of bait on arm B would not be secure and hence ineffective.

U.S. Pat. No. 4,862,632, issued to Kattenberg on Sep. 5, 1989, disclosed a fish hook having its leader line end bent at an angle in a direction from the main hooking end intended for carrying an elongate bait such as a worm over the entire length of the hook such that only the line and bait are visible when the bait is impaled on the entire hook structure as seen in FIG. 3 of the Kattenberg patent. It is readily apparent that the hook and bait will not and are not intended to wobble through the water nor is the bait 22 intended to be subsequently removed from the hooking structure intact once it has been initially trained thereon.

Additional patents of which the present inventor is aware are listed as follows:

| Patent No. | Date | Inventor |
| --- | --- | --- |
| U.S. 4,251,942 | 2/24/81 | Jacobus |
| U.S. 1,505,235 | 6/15/23 | Archer |
| U.S. 805,284 | 11/21/05 | Greenway & Horner |
| U.S. 2,645,054 | 7/12/50 | Taylor |
| U.S. 2,825,174 | 3/4/58 | Leinonen |
| U.S. 70,913 | 11/12/1867 | Sterling |
| British 973,689 | 10/28/64 | Groves |
| U.S. 3,494,066 | 5/5/67 | Lawter |
| U.S. 551,581 | 12/17/1895 | Crane |
| U.S. 551,582 | 12/17/1895 | Crane |
| U.S. 1,461,246 | 7/10/23 | Lent |
| U.S. 564,517 | 7/21/1896 | Hastings |
| U.S. 2,995,858 | 8/15/61 | Rathmann |
| U.S. 1,961,378 | 6/5/34 | Mitchell |
| U.S. 196,648 | 10/30/1877 | Edgar |
| Russian 448,846 | 3/26/73 | Borisevich |
| U.S. 3,400,483 | 9/10/68 | Temple |
| U.S. 3,834,060 | 9/10/74 | Wagenknecht |
| U.S. 1,291,614 | 1/14/19 | Noxon |

Of all the references listed above, none disclose nor suggest a fish hook having an appurtenance for the releasable securement of an artificial bait which includes the means for the interchangability of a variety of such artificial bait as will be described and understood more fully below.

It is the main object of the present invention to provide a fish hook having a stem-like appurtenance onto which a variety of artificial baits having releasable securing means may be interchangeably and securely mounted in a position offset from the barbed hook without having to remove the hook from the fishing line.

It is another object of the present invention to provide a fish hook and artificial bait therefor which, when mounted upon an appurtenance of the hook in the intended manner, increases the buoyancy of live bait on the hook while also imparting a wobbling action when the hook and bait are drawn through water.

It is a further object of the present invention to provide a fish hook and artificial bait therefor which properly orients the hook in the water as it and the bait are drawn therethrough.

It is yet a further object to provide a novel fish hook and artificial bait therefor which can be quickly attached and removed therefrom and be compactly stored either separately or together.

It is another object to provide hooks and artificial baits for fishing which artificial baits are quickly interchangable in size, shape, color, weight, design, on the various shaped and sized hooks for the fishing at hand.

It is still another object to provide hooks and artificial baits for fishing which can cover many fishing conditions with fewer hooks and fewer artificial bait than with known hooks having permanently attached artificial bait or known hooks which can allow disengagement of artificial bait however with damage to said artificial bait occuring.

Other objects will in part be obvious and in part appear hereinafter.

SUMMARY OF THE INVENTION

In accordance with the foregoing objects, the invention comprises in a first respect a fish hook including a stem-like appurtenance and in a second respect an artificial bait for releasable securement to the appurtenance. Various artificial bait securing means are provided whereby the artificial bait may be releasably yet securely attached to the hook appurtenance such that a plurality of such artificial baits may be easily and quickly interchanged as desired upon the appurtenance. It is contemplated that the fisherman may desire to mount additional bait, whether live or artificial, to the barbed portion of the hook in the normal manner and/or other hook and line accessories as desired such as sinker split shot, tail portions, etc. without interference by or to the appurtenance or artificial bait releasably secured thereto.

In a first hook configuration, the appurtenance radially extends from the eyelet portion of the hook on the side of the shank of the hook opposite the barbed end and is of a length approximately ¼ of the length of the hook shank. This type of hook and appurtenance configuration allows for a unique wobble when an artificial bait, having at least it's leading edge of spheroidal configuration, is releasably attached to the appurtenance by one of the various bait attaching means to be described, and is drawn through the water. Also, should a weighted jig be desired to be attached to the appurtenance, the barbed end of the hook will ride above the hook shank and jig and thereby avoid being snagged on bottom weeds and the like.

In a second hook configuration, the appurtenance radially extends from the hook at a position adjacent the terminal, barbed end and, in yet a third hook configuration, extends linearly from the hook shank at the end opposite the barbed end with the hook eye lying in a position offset from the junction of shank and appurtenance. While the second hook configuration described is ideal for increasing the buoyancy of live bait attached to the barbed end of the hook when a bouyant artificial bait or floater is releasably attached to the appurtenance, the third hook configuration described is ideal for releasably attaching a spinning bait to the appurtenance.

It is noted that although only three hook and appurtenance configurations have been just described, an almost limitless variety of hook and appurtenance configurations are possible as will be appreciated more fully in the detailed description of the invention.

A variety of means for releasably attaching the artificial bait to the appurtenance have been contemplated and, in a first embodiment, comprises a sleeve which may be telescopically and securely fit over the appurtenance. While the appurtenance is typically formed of metal as is the rest of the fish hook from which it extends, the sleeve is preferably formed of a resilient material which would provide a sufficient amount of friction between it and the appurtenance such that it will not easily detach itself from the appurtenance once it has been attached thereto. An example of the type of material which the sleeve could be made is heat-shrink tubing.

In a first embodiment, a bore formed in the artificial bait is slidingly fit over the sleeve, there being sufficient friction between the outer surface of the sleeve and the inner surface of the bore such that the artificial bait will not easily unintentionally detach from the sleeve and appurtenance. In an alternate embodiment, the sleeve is fixedly attached to the outer surface of the artificial bait. The sleeve may be slidingly and releasably fit over the appurtenance with the artificial bait attached thereto.

In either embodiment just described, the artificial bait is releasable from the appurtenance with only a pulling action by the fisherman on the artificial bait being necessary. The artificial bait remains intact throughout and, in this respect, many different shapes, sizes, and colors of artificial baits may be selectively interchanged upon the appurtenances of various configurations of fish hooks allowing for seemingly endless artificial bait and fish hook combinations as will be appreciated more fully in the ensuing description.

As aforementioned, means other than a resilient sleeve are contemplated to permit releasable attachment of an artificial bait such as, for example, an end piece which may be releasably attached to the terminal, free end of the appurtenance. A spinning bait, for example, having a central, through bore, may be mounted upon the appurtenance and secured thereon by attaching the end piece on the free end of the appurtenance extending from the through bore. The end piece has a larger outer diameter than the diameter of the through bore which prevents the spinning bait from falling off from the appurtenance. When a different artificial bait is desired to be mounted upon the appurtenance, the end piece is simply removed from the free end thereof whereupon the bait may be taken off of the appurtenance and a new and different bait may be mounted thereon and secured thereto by reattaching the end piece.

In an alternate embodiment, the end piece is resilient and is permanently fixed on the terminal, free end of the appurtenance, its diameter being larger than the diameter of the appurtenance, but only slightly larger than the through bore of the artificial bait. In this way, the bore of the artificial bait may be forced over the end piece thereby compressing it until the artificial bait rests completely on the smaller diameter appurtenance at which point the end piece assume its original, uncompressed diameter, preventing the artificial bait from falling off the appurtenance until it is forcefully pulled back over the end piece.

Other means of releasably attaching the artificial bait to the appurtenance include at least a portion of the appurtenance being of a second, larger diameter than either the rest of the appurtenance and/or the normal diameter of the rest of the fish hook which embodiment encompasses the last end piece embodiment just described in a sense. Also, a threaded appurtenance and corresponding threaded bore of the artificial bait or sleeve is also disclosed as is a resilient button having an eyelet portion for fitting over the appurtenance while the opposite, button-like end is releasably inserted into the bore opening of the artificial bait.

It may be realized from the foregoing that many means of releasably attaching the artificial bait to the appurtenance are envisioned and those means disclosed herein are but a few of the full scope of this invention.

DETAILED DESCRIPTION

Figure 1:
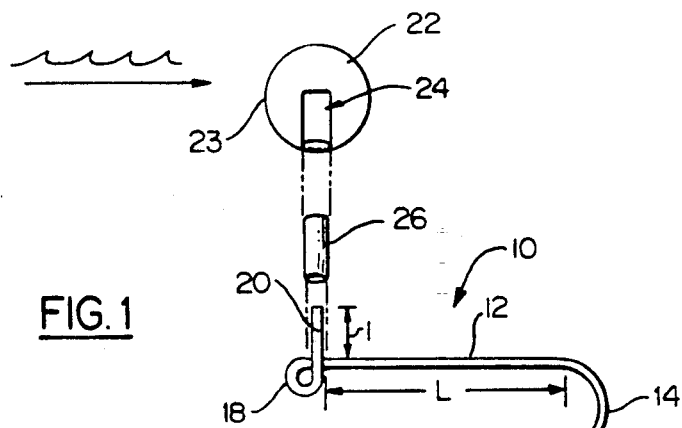
FIG. 1 is an exploded, side elevational view of a first hook configuration showing one means of releasable attachment of an artificial bait to the appurtenance.

Referring now to the drawings, there is seen in FIG. 1 a fish hook designated generally by the reference numeral 10 having a linear shank 12, a rounded hook portion 1g with terminal barb 16, and eye portion 18 for attachment of fishing line (not shown). A stem-like appurtenance 20 linearly extends from eye portion 18 and is of a length 1 approximately $\frac{1}{8}$ to $\frac{1}{4}$ the length L of shaft 12. It is seen that appurtenance 20 lies in the same plane as rounded hook portion 14 and extends perpendicular to shank 12 on the side opposite hook portion 14. It is also seen that eye portion 18 lies in the same plane as both hook portion 14 and appurtenance 12. This hook configuration of FIG. 1 permits for a unique wobble once an artificial bait having a substantially spheroidal leading edge, such as artificial bait 22 shown, is releasably attached to appurtenance 20 by means to be described. Although appurtenance 20 is seen to extend perpendicular to shank 12, it may be desired to have appurtenance 20 extend at an angle to shank 12 in a direction either to the right or left. It is to be understood, therefore, that the relative appurtenance 20 placements on the hooks 10 shown and described throughout this specification are but several of the appurtenance-hook configurations possible. For the purposes of this invention, it is merely necessary that an appurtenance extend from the conventional, known fish hook, be it in any position as will be understood as this description continues.

It is seen in the embodiment of FIG. 1 that appurtenance 20 is an integral extension of hook 10 whereby appurtenance 20 is formed of the same material as hook 10 although it is not necessary that this be so, of course. Appurtenance 20 could be formed of other known, rigid materials and be fixedly attached to hook 10 by known means in the desired position. Artificial bait 22 is preferably spheroidal as shown and includes a bore 24 in one side thereof for releasable attachment to appurtenance 20. Again, although it is stated that artificial bait 22 be spheroidal in shape, it is merely necessary that leading edge 23 be spheroidal if it is desired that fish hook 10 wobble as it is drawn through the water with the water traveling in the direction of the arrow. If no wobble action is desired, the artificial bait 22 may be of any shape desired.

In FIG. 1, a first means to releasably attach the artificial bait 22 to appurtenance 20 is in the form of a tubular sleeve 26 which is made of a resilient material such as foam rubber or plastic which will frictionally engage appurtenance 20 once sleeve 26 has been telescopically fit thereover. With sleeve 26 thus secured to appurtenance 20, bore 24 of artificial bait 22 is telescopically slid over sleeve 26 which, by its resilient nature, frictionally engages bait 22 such that bait 22 will not disengage from appurtenance 20 unless a force is applied thereto sufficient to overcome the frictional force. This may be accomplished by the fisherman manually grasping and forcefully pulling artificial bait 22 off from sleeve 26.

It is noted that in the embodiment of FIG. 1, it is preferred that sleeve 26 be fixedly secured to appurtenance 20 such that it does not detach therefrom when an artificial bait 22 is repeatedly attached and removed therefrom and an adhesive, such as a fast bonding glue, is suggested to be used when sleeve 26 is telescopically fit over appurtenance 20. A plurality of tiny barbs or serrations on the appurtenance outer surface could also be used to secure the sleeve to the appurtenance. Alternately and just as effective, sleeve 26 may be heat-shrink tubing which adheres to appurtenance upon heat being applied thereto. It is stressed that the various means disclosed herein for releasably attaching an artificial bait, such as bait 22, to a hook appurtenance, such as appurtenance 20, provide for the quick and easy interchangability of one type of artificial bait with another. Thus, should a bait different than bait 22 be desired to be attached to appurtenance 20, the fisherman need only remove artificial bait 22 and replace it with another artificial bait, perhaps of a different shape or color, having a bore 24 for attachment to sleeve 26 when the attachment means of FIG. 1 is employed.

It is also noted that in the hook configuration of FIG. 1, should a weighted jig be attached to appurtenance 20 via sleeve 26, the fish hook would travel through the water in a position inverted to that seen in FIG. 1. On the other hand, if a bouyant bait is attached to appurtenance 20, hook 10 would travel through the water in the position seen in FIG. 1 and tend to increase the buoyancy of any bait, live or artificial, attached to hook end 14 through barb 16.

Figure 2:
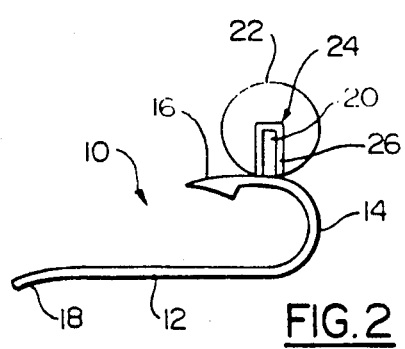
FIG. 2 is a side, elevational view in cross-section of a second hook configuration with artificial bait releasably attached to the appurtenance thereof.

Turning attention to FIG. 2, it is seen that appurtenance 20 radially extends from hook 10 at a location between barb 16 and rounded hook portion 14 rather than from the 18 as seen in FIG. 1. It is also seen that eye 18 in the hook configuration of FIG. 2 lies in a plane perpendicular to the plane of eye 18 in FIG. 1. The position of appurtenance 20 in FIG. 2 stresses the point that appurtenance 20 may extend from anywhere along hook 10. Artificial bait 22 is in the attached position in FIG. 2 and may be released from appurtenance 20 as desired by manually pulling bait 22 off the sleeve 26 which has been previously fixedly attached to appurtenance 20.

Figure 3:
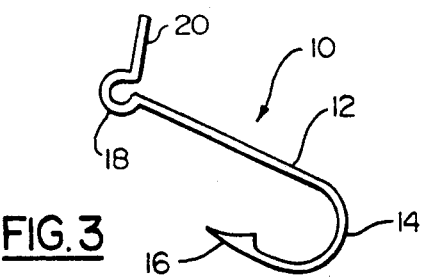
FIG. 3 is a perspective view of a third hook configuration.

FIG. 3 illustrates an alternate hook configuration wherein hook 10, including rounded hook portion 14, barb 16 and shank 12, and eye portion 18 are coplanar while appurtenance 20 lies in a perpendicular plane. Means of releasably attaching artificial bait 22 to the appurtenance 20 seen in FIG. 3 may be by the resilient sleeve 26 seen in FIGS. 1 and 2, or by yet additional releasable securing means to be described.

Figure 4:
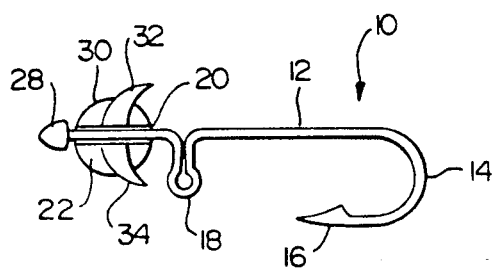
FIG. 4 is a side, elevational view of a fifth hook configuration and a further means of releasable attachment of an artificial bait to the appurtenance.
Figure 4A:
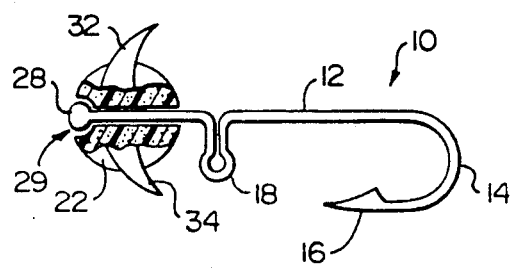
FIG. 4A is the view of FIG. 4 illustrating an optional configuration of the artificial bait.

Turning attention to FIG. 4, the appurtenance 20 is seen to extend linearly from hook shank 12 with eye portion 18 in a position offset therefrom and located at the juncture of shank 12 and appurtenance 20. Alternate artificial bait releasable attachment means is provided in the form of an end piece or cap 28 which may be releasably attached, (or fixedly, in an alternate embodiment to be described), to the terminal end appurtenance 20, presumably either by friction or engaging threads. The artificial bait 22 is seen to include a through bore 30 by which it is slidingly mounted upon appurtenance 20. With sleeve 26 thus being absent in the embodiment of FIG. 4, artificial bait 22 may freely axially rotate about appurtenance 20 since the diameter of its bore is slightly larger than the diameter of appurtenance 20 and, in this regard, include wings 32 and 34 to provide for spinning action of bait 22 as it is drawn through water. Should a different artificial bait be desired, end piece 28 is removed, artificial bait 22 is slid off of appurtenance 20 and another artificial bait having an axial through bore is slidingly mounted upon appurtenance 20 and end piece 28 replaced. As seen in FIG. 4A a socket 29 may be present in one end of the artificial bait, in order that the end piece does extend beyond the bait.

If it is desired that end piece 28 be fixedly attached to appurtenance 20, it need only be of a diameter smaller than that shown in FIG. yet slightly larger than bore 20 of artificial bait 22 and preferably, but not necessarily, also of a resilient material. Thus, artificial bait 22 may be "squeezed over" end piece 28 in this instance by compressing under the force of bore 30 as it is passed thereover. Once clear of end piece 28, artificial bait 22 rests upon appurtenance 20 and end piece 28 assumes its original shape to prevent artificial bait 22 from falling off appurtenance 20 until the fisherman forcefully pulls it back over end piece 28.

Figure 5:
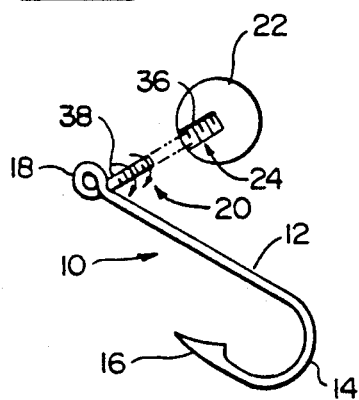
FIG. 5 is a perspective view of a fourth hook configuration showing another means of releasably attaching the artificial bait to the appurtenance.

In FIG. 5, a further method of releasably attaching an artificial bait to an appurtenance is illustrated by the use of engaging threads 36 located on the surface of internal bore 24 of artificial bait 22 with corresponding threads 38 located on the surface of appurtenance 20. Alternately, sleeve 26 may have internal threads (not shown) which would releasably mount it to appurtenance 20 via threads 38.

Figure 6:
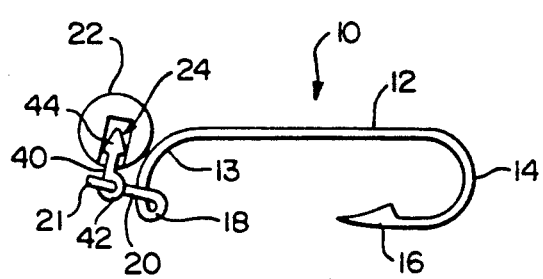
FIG. 6 is a side. elevational view in cross-section of a sixth hook configuration showing yet a further means of releasably attaching an artificial bait to the appurtenance.

In FIG. 6, a still further method of releasably attaching an artificial bait to an appurtenance is illustrated by the use of a bait attaching piece 40 which is formed of a resilient material similar to the material from which sleeve 26 is formed. Bait attaching piece 40 comprises an eyelet 42 at a first end thereof for insertion of the terminal end 21 of appurtenance 20. A spade-shaped button 44 is located at the opposite end of attaching piece 40 for inserting into bore 24 of artificial bait 22. Button 44 is formed of a resilient material as is the rest of the attaching piece 40 and has portions of a maximum diameter which frictionally engage the surface of bore 24 such that artificial bait 22 will not disengage from button 44 without forcefully pulling it therefrom as is necessary to remove baits 22 seen in FIGS. 1 and 2. It is noted that the action of repeatedly releasing and reattaching of baits 22 to the appurtenances does not harm the integrity of either the baits 22 or the securing means, such as sleeve 26 or button 44, as would occur without such securing means. It is noted also that in the hook configuration of FIG. 6, the end of shaft 12 opposite rounded hook portion 14 tapers toward barb 16 to form an arcuate portion 13. This hook configuration further illustrates the hook appurtenance and configurations possible pursuant to this invention.

Figure 7:
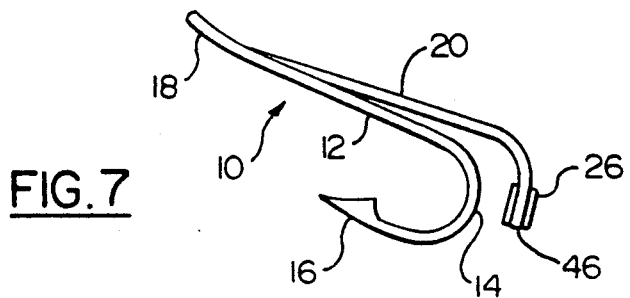
FIG. 7 is a perspective view in cross-section of a seventh hook configuration.

Turning attention to FIG. 7, hook 10 is seen to include an elongated appurtenance 20 which extends from eye portion 18 linearly and slightly divergent of shank 12 to a point past rounded hook portion 14 at which point appurtenance 20 tapers toward hook portion 14 to terminate into a blunt end 46. Although a sleeve 26 is shown to be attached to appurtenance 20 at end 26 for purposes of illustration, it should be clear that the other types of artificial bait releasable securing mean are possible with the invention as disclosed herein.

Figure 8:
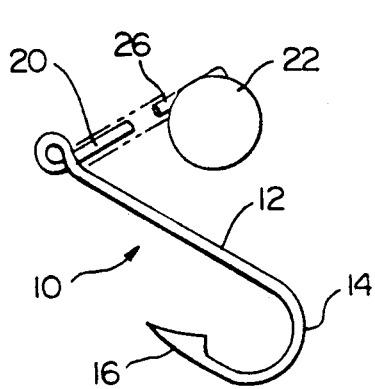
FIG. 8 is the view of FIG. 5 showing still another means of releasably attaching an artificial bait to the appurtenance.
Figure 9:
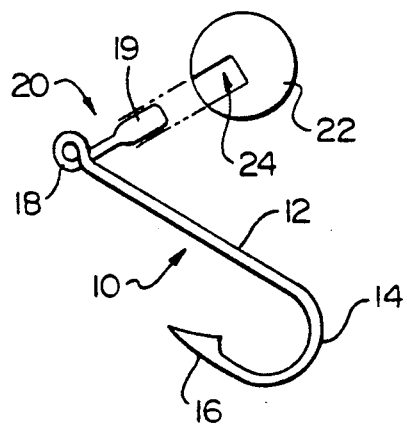
FIG. 9 is a perspective view of the hook configuration seen in FIGS. 5 and g but showing still another means of releasably attaching an artificial bait to the appurtenance and FIG. 10 is a perspective view of the hook configuration of FIG. showing a resilient-type artificial bait for releasable attachment upon the appurtenance.

FIG. 8 illustrates an alternate method by which a sleeve 26 and artificial bait 22 may be releasably attached to an appurtenance 20. In this method, sleeve 26 has been fixedly attached to the outer surface of artificial bait 22, for example, by epoxy or other quick bonding adhesives. Sleeve 26, with artificial bait 22 attached thereto, is telescopically yet releasably mounted upon appurtenance 20. The frictional engagement between appurtenance 20 and sleeve 26 is such that the sleeve 26 will not disengage from appurtenance 20 without a forceful pull on the artificial bait 22. Sleeve 26 in this instance may therefore be repeatedly slid on and off from appurtenance 20 as desired, permitting for a selective variety of artificial baits to be mounted upon appurtenance 20 as desired. It will also be appreciated that in this method, there is no need for a bore 24 in artificial bait 22 as is needed for the methods of attachments discussed heretofore.

In FIG. a further releasable attachment method is disclosed which comprises forming at least a portion of appurtenance 20 of a diameter larger than the diameter of the rest of the fish hook 10. In this case, bore 24 of artificial bait 22 is also enlarged to closely approximate the diameter of the increased diameter portion 19 of appurtenance 20 such that there is a tight frictional engagement between bore 24 and appurtenance portion 19 when the former is telescopically fit over the latter. The large surface area created by the increased diameters of both appurtenance portion 19 and bore 24 provide for a more secure engagement of artificial bait 22 upon appurtenance 20 than would be possible with the normal diameters of fish hooks 10.

The appurtenance portion 19 may be of the same metallic material from which the hook 10 is formed or it may be desired that it be formed of a resilient material such as sleeve 26 to provide for optimal frictional hold of artificial bait 22 thereon.

Figure 10:
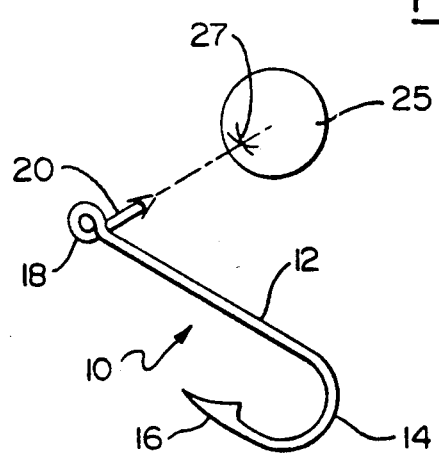

In FIG. 10, an artificial bait 25 is seen which is formed entirely of a resilient material such as rubber. Fish hook 10 is of the same type and configuration as seen and described in FIG. 8. Artificial bait may be releasably secured to appurtenance 20 by inserting the end of appurtenance 20 into perforation 27 formed in artificial bait 25 until it rests securely on appurtenance 20. Although the entire artificial bait 25 is shown here formed of a resilient material, it is merely necessary that a portion of the artificial bait large enough to receive appurtenance 20 be provided.

It may thus be realized from the foregoing description that there is provided novel means of releasably attaching an artificial fish bait to an appurtenance on a fish hook. As such, the fisherman has an almost limitless selection of different artificial baits he may choose to use on the hook appurtenance.

While the invention has been described in conjunction with preferred embodiments thereof, it will be understood that this description is intended to illustrate and not to limit the scope of the invention, which is defined by the following claims.

What is claimed is:

1. A fish hook for releasable attachment of an artificial bait, said hook comprising:
   a) a shank having a first, terminal end including means for attachment to fishing line and a second end tapering toward said first end to form a hooking portion;
   b) an appurtenance attached to and extending from said fish hook and including a substantially linear, terminal end portion; and
   c) a sleeve formed of resilient, heat-shrink tubing telescopically connected to said appurtenance such that said appurtenance and sleeve may be inserted into a bore formed in said artificial bait thereby frictionally and releasably engaging said artificial bait to said appurtenance.

2. A fish hook for releasable attachment of an artificial bait, said hook comprising:
   a shank having a first, terminal end including means for attachment to fishing line and a second end tapering toward said first end to form a hooking portion;
   b) an appurtenance attached to and extending from said fish hook and including a substantially linear, terminal end portion; and
   c) a resilient sleeve fixedly and telescopically attached inside a bore formed in said artificial bait, said sleeve including an internal diameter substantially the same as the outside diameter of said appurtenance when the former is releasably mounted to the latter thereby providing a secure friction fit between said artificial bait and said appurtenance.

3. A fish hook for releasable attachment of an artificial bait, said hook comprising:
   a) a shank having a first, terminal end including means for attachment to fishing line and a second end tapering toward said first end to form a hooking portion;
   b) an appurtenance attached to and extending from said fish hook and including a substantially linear, terminal end portion; and
   c) a resilient sleeve fixedly attached in covering relation to said appurtenance terminal end portion and having an outer diameter substantially the same as the inner diameter of a bore formed in said artificial bait when the former is releasably mounted to the latter such that said artificial bait may be frictionally and releasably engaged to said appurtenance upon insertion of said appurtenance and sleeve into said bore thereby providing a secure friction fit between said artificial bait and said appurtenance.

4. The invention according to claim 3 wherein said shank is linear and said fishing line attachment means comprises an eyelet integrally attached to said shank first end, said appurtenance linearly extending from said eyelet in a direction perpendicular to said shank.

5. The invention according to claim 4 wherein the length of said appurtenance is substantially between ⅛ and ¼ the length of said shank.

6. A fish hook for releasable attachment of an artificial bait, said hook comprising:
   a) a shank having a first, terminal end including means for attachment to fishing line and a second end tapering toward said first end to form a hooking portion;
   b) an appurtenance attached to and extending from said fish hook and including a substantially linear, terminal end portion; and
   c) a resilient sleeve fixedly attached to the outer surface of said artificial bait such that said artificial bait may be releasably attached to said appurtenance by inserting said appurtenance into said sleeve thereby frictionally and releasably securing said artificial bait to said appurtenance.

7. The invention according to claim 6 wherein said sleeve has an internal diameter substantially the same as the outer diameter of said appurtenance when mounted thereto.

8. A fish hook for releasable attachment of an artificial bait, said hook comprising:
   a) a shank having a first, terminal end including means for attachment to fishing line and a second end tapering toward said first end to form a hooking portion;
   b) an appurtenance attached to and extending from said fish hook and including a substantially linear, terminal end portion; and
   c) an artificial bait attaching piece including first and second ends, said first end including an eye adapted for releasable, sliding engagement upon said appurtenance terminal end portion and said second end including a resilient button for releasable insertion into a bore formed in said artificial bait whereby said resilient button frictionally engages the internal surface of said bore.

9. A fish hook for releasable attachment of an artificial bait, said hook comprising:
   a) a shank having a first, terminal end including means for attachment too fishing line, and a second end tapering toward said first end to form a hooking portion;
   b) an appurtenance attached to and extending from said hook and terminating at a substantially linear, free end; and
   c) a sleeve mounted in covering relation to said free end of said appurtenance whereby said sleeve and said appurtenance free end may be inserted into a bore formed in said artificial bait thereby frictionally and releasably engaged said artificial bait to said appurtenance.

* * * * *